(12) United States Patent
Bjoerk (10) Patent No.: US 12,269,539 B2
(45) Date of Patent: Apr. 8, 2025

(54) MECHANICAL JOINT WITH FIVE DEGREES OF FREEDOM

(71) Applicant: Volvo Truck Corporation, Gothenburg (SE)

(72) Inventor: Carl Bjoerk, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 312 days.

(21) Appl. No.: 17/919,337

(22) PCT Filed: Jun. 1, 2020

(86) PCT No.: PCT/US2020/035540
§ 371 (c)(1),
(2) Date: Oct. 17, 2022

(87) PCT Pub. No.: WO2021/247001
PCT Pub. Date: Dec. 9, 2021

(65) Prior Publication Data
US 2023/0158849 A1  May 25, 2023

(51) Int. Cl.
*B62D 33/067*  (2006.01)
*B60G 7/00*   (2006.01)
(Continued)

(52) U.S. Cl.
CPC ........... *B62D 33/067* (2013.01); *B60G 7/001* (2013.01); *B60G 7/005* (2013.01); *B60G 7/02* (2013.01);
(Continued)

(58) Field of Classification Search
CPC ...... B62D 24/00; B62D 24/04; B62D 33/063; B62D 33/0633; B62D 33/067;
(Continued)

(56) References Cited

U.S. PATENT DOCUMENTS

| | | |
|---|---|---|
| 2,369,501 A | 2/1945 | Wagner et al. |
| 5,951,030 A | 9/1999 | Butler |
| (Continued) | | |

FOREIGN PATENT DOCUMENTS

| | | |
|---|---|---|
| DE | 4422875 A1 | 1/1996 |
| DE | 102019008213 A1 | 5/2021 |
| JP | H05229458 A | 9/1993 |

OTHER PUBLICATIONS

Extended European Search Report for European Patent Application No. 20938791.9, mailed Feb. 1, 2024, 10 pages.
(Continued)

*Primary Examiner* — Dennis H Pedder
(74) *Attorney, Agent, or Firm* — Withrow & Terranova, PLLC (57) ABSTRACT

Aspects of the disclosure relate to a mechanical joint with five degrees of freedom. In certain embodiments, the mechanical joint includes first and second triangular linkages. The first triangular linkage includes a base end configured to hingedly couple to a first body to pivot relative to the first body and a vertex end that includes a first rotational member. The second triangular linkage includes a base end configured to hingedly couple to a second body to pivot relative to the second body and a vertex end that includes a second rotational member. The first rotational member and the second rotational member are rotationally coupled to form a all joint. With this joint, the second body is moveable in two translational degrees of freedom and restricted in one translational degree of freedom relative to the first body. Such a configuration allows vertical movement and/or reduces stress on the joint.

13 Claims, 9 Drawing Sheets

(51) Int. Cl.
*B60G 7/02* (2006.01)
*B60G 9/02* (2006.01)
*B60G 99/00* (2010.01)
*B62D 24/00* (2006.01)
*B62D 24/04* (2006.01)
*B62D 33/063* (2006.01)
*B62D 33/077* (2006.01)
*B62D 33/10* (2006.01)

(52) U.S. Cl.
CPC ............. *B60G 9/02* (2013.01); *B60G 99/002* (2013.01); *B62D 24/00* (2013.01); *B62D 24/04* (2013.01); *B62D 33/063* (2013.01); *B62D 33/0633* (2013.01); *B62D 33/077* (2013.01); *B62D 33/10* (2013.01); *B60G 2204/143* (2013.01); *B60G 2204/416* (2013.01); *B60G 2206/12* (2013.01); *B60G 2206/31* (2013.01); *B60G 2300/0262* (2013.01)

(58) Field of Classification Search
CPC ...... B62D 33/077; B62D 33/08; B62D 33/10; B60G 7/005; B60G 2204/416
USPC ............................................ 296/190.04, 0.05
See application file for complete search history.

(56) References Cited

U.S. PATENT DOCUMENTS

| | | | |
|---|---|---|---|
| 6,340,201 | B1 | 1/2002 | Higuchi |
| 8,434,581 | B2 * | 5/2013 | Buhl .................... B60G 99/008 296/190.07 |
| 2007/0056787 | A1 | 3/2007 | Haeusler et al. |
| 2008/0100021 | A1 * | 5/2008 | Yamada .................... B60G 3/01 280/124.164 |
| 2011/0095569 | A1 | 4/2011 | Haeusler et al. |
| 2011/0248464 | A1 | 10/2011 | Buhl et al. |
| 2012/0011946 | A1 | 1/2012 | Eriksen et al. |
| 2012/0098296 | A1 | 4/2012 | Lorenz et al. |
| 2014/0042776 | A1 | 2/2014 | Leeder |
| 2018/0178607 | A1 | 6/2018 | Haeusler |
| 2019/0161198 | A1 * | 5/2019 | Combes .................. F16C 11/02 |

OTHER PUBLICATIONS

International Search Report and Written Opinion for International Patent Application No. PCT/US2020/035540, mailed Aug. 24, 2020, 9 pages.

\* cited by examiner

MECHANICAL JOINT WITH FIVE DEGREES OF FREEDOM

This application is a 35 USC 371 national phase filing of International Application No. PCT/US2020/035540, filed Jun. 1, 2020, the disclosure of which is incorporated herein by reference in its entirety.

FIELD OF THE DISCLOSURE

The disclosure relates generally to mechanical joints. In particular aspects, the disclosure relates to vehicles and mechanical joints having five degrees of freedom.

BACKGROUND

Mechanical joints are typically designed with selected degrees of freedom. For example, vehicles, such as heavy truck vehicles, include a suspension element to allow relative vertical movement between the axle and the chassis and between the cab body of the vehicle and the chassis, while restricting lateral movement of either the axle or the cab body relative to the chassis.

Current mechanical joints used for such applications may have multiple pieces, which increase complexity, cost, and risk of failure (as there are more pieces and couplings which may fail). Further, depending on how many degrees of freedom are provided, such mechanical joints may experience increased stress, which may also increase risk of failure.

SUMMARY

According to an aspect of the disclosure, a mechanical joint includes a first triangular linkage and a second triangular linkage. The first triangular linkage includes a base end configured to hingedly couple to a first body for pivoting movement relative to the first body and a vertex end that includes a first rotational member. The second triangular linkage includes a base end configured to hingedly couple to a second body for pivoting movement relative to the second body and a vertex end that includes a second rotational member. The first rotational member and the second rotational member are rotationally coupled to form a ball joint such that the base end of the second triangular linkage is moveable in two translational degrees of freedom and restricted in one translational degree of freedom relative to the base end of the first triangular linkage.

In certain embodiments, each of the first triangular linkage and the second triangular linkage includes a bar at the base end and two arms extending from the bar to the vertex end.

In certain embodiments, each of the first triangular linkage and the second triangular linkage includes a triangular plate having a vertex end and a base end. The base end may include a bar.

In certain embodiments, each of the first triangular linkage and the second triangular linkage includes two arms extending from the base end to the vertex end, each of the two arms of the first triangular linkage configured to independently and hingedly couple to the first body, and each of the two arms of the second triangular linkage configured to independently and hingedly couple to the second body.

In certain embodiments, the first triangular linkage is configured to be restricted to one degree of freedom relative to the first body and the second triangular linkage is configured to be restricted to one degree of freedom relative to the second body.

According to another aspect of the disclosure, a mechanical system includes a first body, a second body, and at least one mechanical joint coupling the first body to the second body. The at least one mechanical joints includes a first triangular linkage and a second triangular linkage. The first triangular linkage includes a base end configured to hingedly couple to a first body to pivot relative to the first body about a first base axis and a vertex end that includes a first rotational member. The second triangular linkage includes a base end configured to hingedly couple to a second body to pivot relative to the second body about a second base axis and a vertex end that includes a second rotational member. The first rotational member and the second rotational member are rotationally coupled to form a ball joint such that the second body is moveable in two translational degrees of freedom and restricted in one translational degree of freedom relative to the first body.

In certain embodiments, each of the first triangular linkage and the second triangular linkage includes a bar at the base end and two arms extending from the bar to the vertex end.

In certain embodiments, each of the first triangular linkage and the second triangular linkage includes a triangular plate extending from the base end to the vertex end.

In certain embodiments, for each of the at least two mechanical joints, the first triangular linkage includes two arms extending from the base end to the vertex end, each of the two arms of the first triangular linkage configured to independently and hingedly couple to the first body, and each of the two arms of the second triangular linkage configured to independently and hingedly couple to the second body.

In certain embodiments, for each of the at least two mechanical joints, the first triangular linkage is hingedly coupled for one degree of freedom relative to the first body and the second triangular linkage is hingedly coupled for one degree of freedom relative to the second body.

In certain embodiments, axes of the first triangular linkage of the at least two mechanical joints are parallel to one another.

In certain embodiments, axes of the second triangular linkage of the at least two mechanical joints are parallel to one another.

According to another aspect of the disclosure, a vehicle includes a chassis, a cab body, and at least one mechanical joint coupling the chassis to the cab body. The at least one mechanical joint includes a first triangular linkage and a second triangular linkage. The first triangular linkage includes a base end configured to hingedly couple to the chassis to pivot relative to the chassis and a vertex end that includes a first rotational member. The second triangular linkage includes a base end configured to hingedly couple to the cab body to pivot relative to the cab body and a vertex end that includes a second rotational member. The first rotational member and the second rotational member are rotationally coupled to form a ball joint, and the second body is moveable in two translational degrees of freedom and restricted in one translational degree of freedom relative to the first body.

In certain embodiments, each of the first triangular linkage and the second triangular linkage includes a bar at the base end and two arms extending from the bar to the vertex end.

In certain embodiments, each of the first triangular linkage and the second triangular linkage includes a triangular plate extending from the base end to the vertex end.

In certain embodiments, each of the first triangular linkage and the second triangular linkage includes two arms extending from the base end to the vertex end, each of the two arms of the first triangular linkage configured to independently and hingedly couple to the first body, and each of the two arms of the second triangular linkage configured to independently and hingedly couple to the second body.

In certain embodiments, for the at least one mechanical joint, the first triangular linkage hingedly coupled for one degree of freedom relative to the first body and the second triangular linkage is hingedly coupled for one degree of freedom relative to the second body.

In certain embodiments, the at least one mechanical joint includes at least two mechanical joints.

In certain embodiments, the vehicle further includes a mechanical system including a plurality of mechanical joints. Each mechanical joint of the mechanical system configured to couple one of the plurality of axles to the frame rails.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary, and are intended to provide an overview or framework for understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
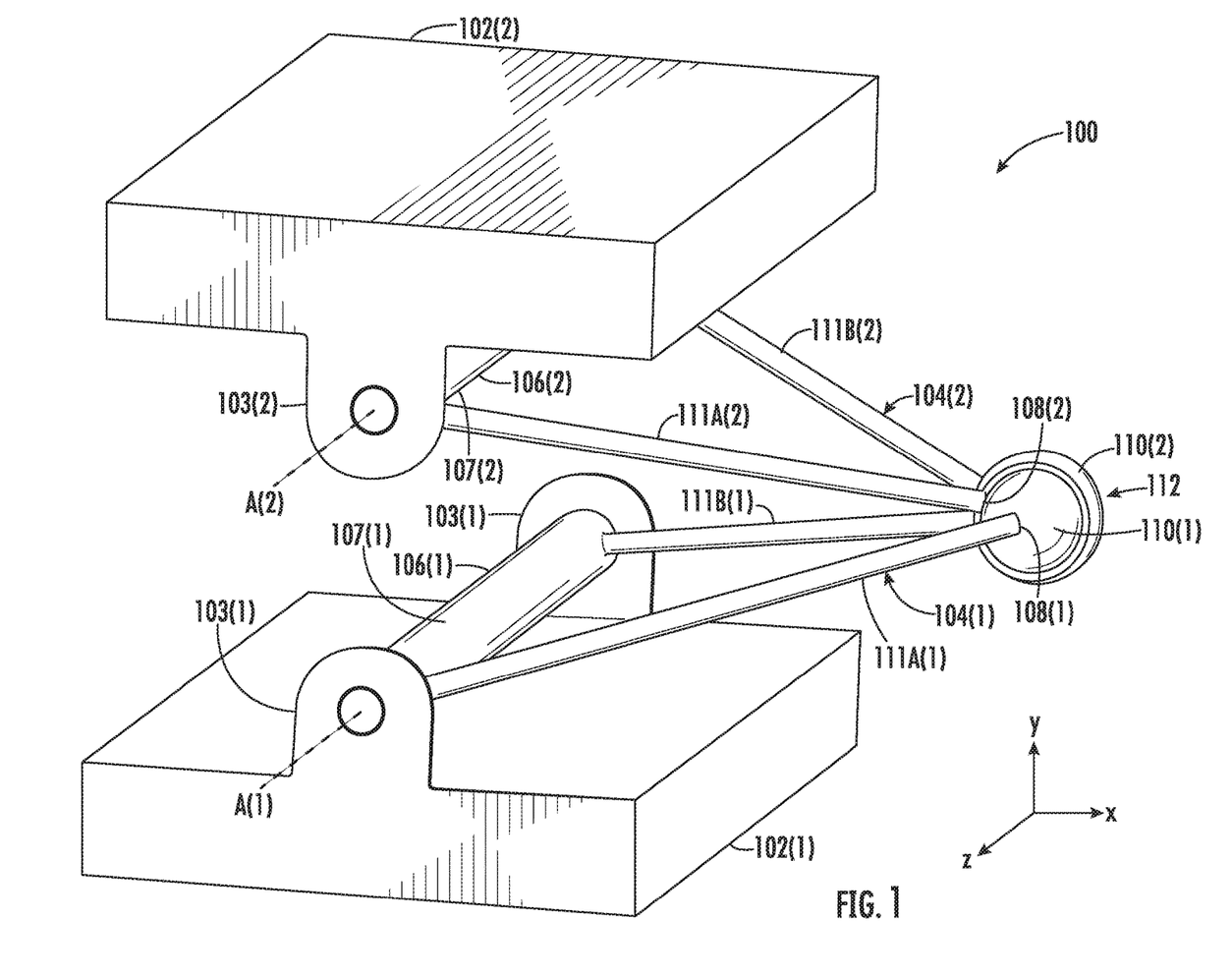
FIG. 1 is a perspective view of a mechanical joint.

FIG. 1 is a perspective view of a mechanical joint 100 coupling a first body 102(1) to a second body 102(2). The first body 102(1) includes pivot brackets or flanges 103(1) and the second body 102(2) includes pivot brackets or flanges 103(2) (referred to collectively as flanges 103). The mechanical joint 100 includes a first triangular linkage 104(1) and a second triangular linkage 104(2).

The first triangular linkage 104(1) includes a base end 106(1) configured to hingedly couple to the first body 102(1) (e.g., by flanges 103(1)) for pivoting movement relative to the first body 102(1) about a first axis A(1). In certain embodiments, the base end 106(1) includes bushings to facilitate hinged rotation. The hinge coupling restricts the first triangular linkage 104(1) to one degree of freedom relative to the first body 102(1). The first triangular linkage 104(1) further includes a vertex end 108(1) including a first rotational member 110(1). In certain embodiments, the first triangular linkage 104(1) includes a bar 107(1) at the base end 106(1) and two arms 111A(1), 111B(1) extending from the bar 107(1) to the vertex end 108(1). In other embodiments, the first triangular linkage 104(1) includes other triangular configurations (e.g., plates having a vertex end and a base end).

Similarly, the second triangular linkage 104(2) includes a base end 106(2) configured to hingedly couple to the second body 102(2) (e.g., by flanges 103(2)) for pivoting movement relative to the second body 102(2) about a second axis A(2). In certain embodiments, the base end 106(2) includes bushings to facilitate hinged rotation. The hinged coupling restricts the second triangular linkage 104(2) to one degree of freedom relative to the second body 102(2). The second triangular linkage 104(2) further includes a vertex end 108(2) including a second rotational member 110(2). In certain embodiments, the second triangular linkage 104(2) includes a bar 107(2) at the base end 106(2) and two arms 111A(2), 111B(2) extending from the bar 107(2) to the vertex end 108(2). In other embodiments, the second triangular linkage 104(2) includes other triangular configurations (e.g., plates having a vertex end and a base end).

The bars 107(1), 107(2) extend between and couple to the flanges 103 for mounting the first and second triangular linkages 104(1), 104(2) to the first and second bodies 102(1), 102(2). The bars 107(1), 107(2) provide structural support and rigidity, but other coupling configurations may be used to couple the first and second triangular linkages 104(1), 104(2) to the first and second bodies 102(1), 102(2).

The first triangular linkage 104(1) has three rotational degrees of freedom relative to the second triangular linkage 104(2) (about the X axis, Y axis, and Z axis). The first rotational member 110(1) and the second rotational member 110(2) are rotationally coupled to form a ball joint 112 such that the first body 102(1) is moveable in two translational degrees of freedom (along X axis and Y axis) and restricted in one translational degree of freedom relative to the second body 102(2) (along Z axis).

In particular, the first rotational member 110(1) is embodied as a rounded body, such as a ball or portion of a sphere, with the first arm 111A(1) and a second arm 111B(1) connected to the first rotational member 110(1) with a space between them. The second rotational member 110(2) is embodied as a socket in which the first rotational member 110(1) is seated. The second rotational member 110(2) may be configured as a curved band extending around the first rotational member and disposed between the first arm 111A(2) and the second arm 111B(2). The second rotational member 110(2) includes spaced apart apertures on opposite sides of the socket to receive at least a portion of the first arm 111A(1) and the second arm 111B(1) of the second triangular linkage 104(2). In certain embodiments, the first arm 111A(1) and second arm 111B(1) constrain rotation of the second rotational member 110(2) about the Y axis. In certain embodiments, the ball joint 112 includes bushings to facilitate rotation (e.g., between the first rotational member 110(1) and the second rotational member 110(2), It is noted that the further apart the first and second arms are positioned on the first rotational member 110(1) (e.g., positioned along a diameter of the ball shown in FIG. 1), the greater the range of rotation of the first triangular linkage 104(1) (e.g., about the X axis, Y axis, and/or Z axis) relative to the second triangular linkage 104(2). Other types of spherical or semi-spherical members and/or sockets could be used depending on the range of rotation required.

Figure 2A:
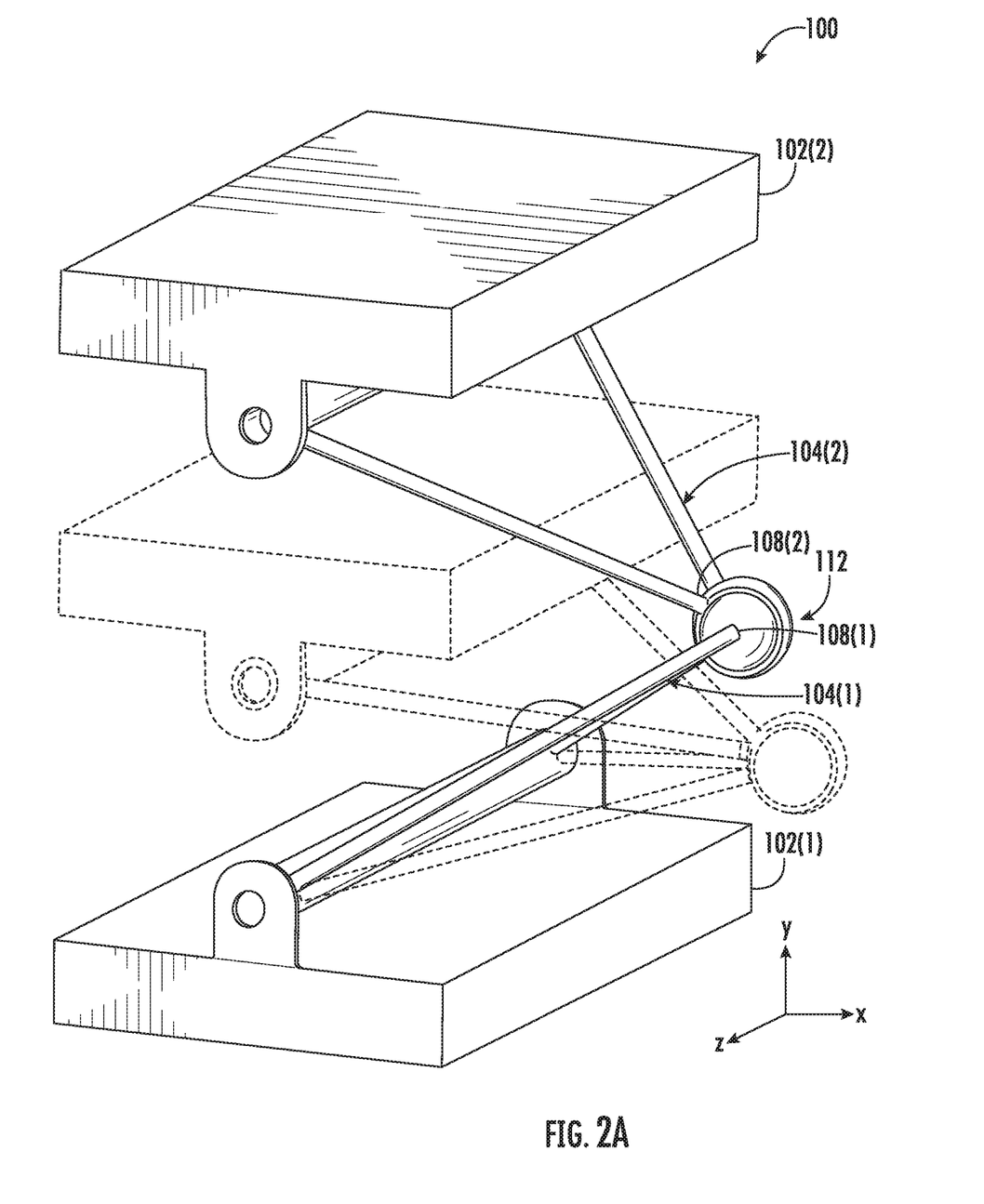
FIG. 2A is a perspective view of the mechanical joint of FIG. 1A illustrating vertical translation of the mechanical joint.
Figure 2B:
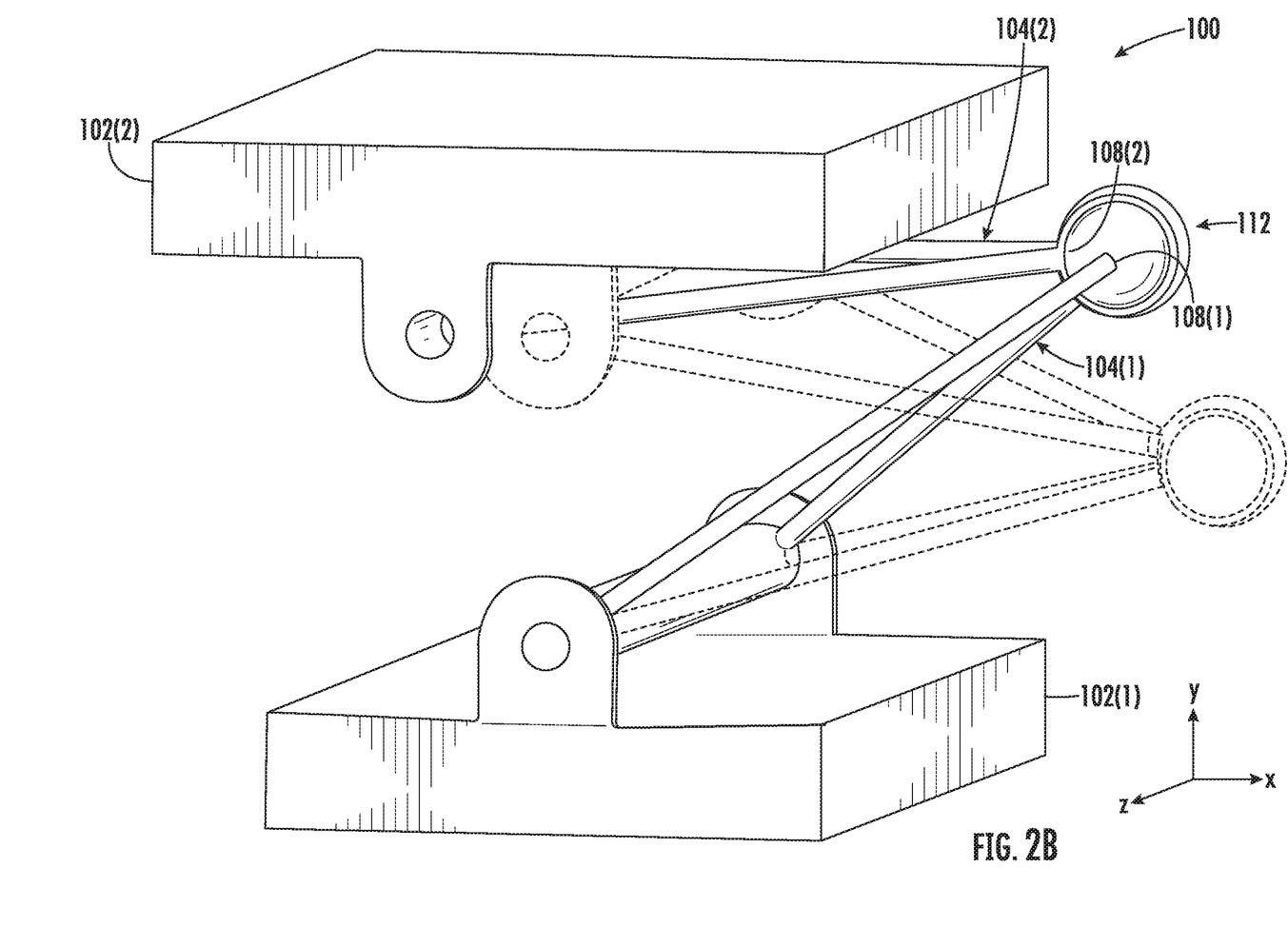
FIG. 2B is a perspective view of the mechanical joint of FIG. 1A illustrating horizontal translation of the mechanical joint.
Figure 2C:
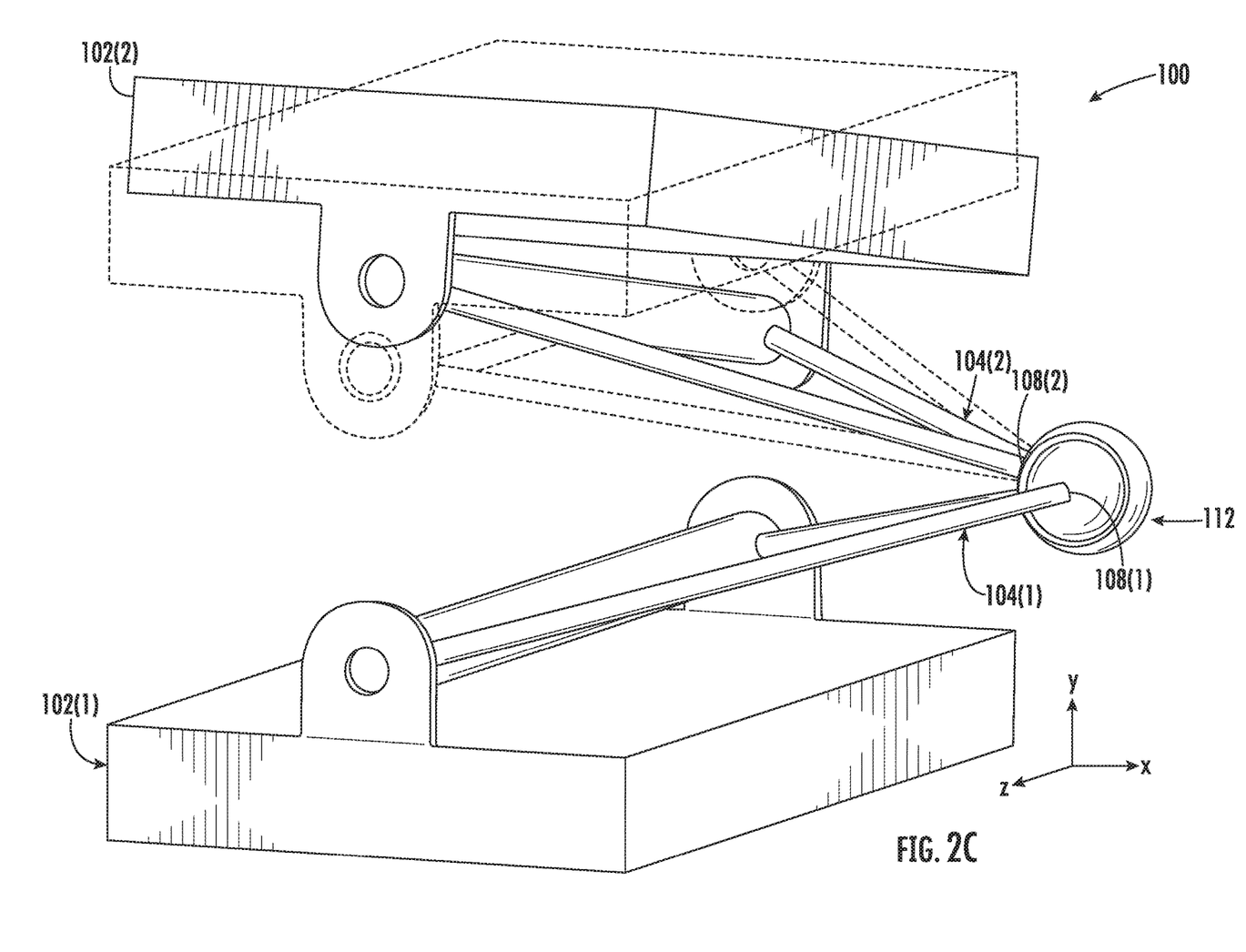
FIG. 2C is a perspective view of the mechanical joint of FIG. 1A illustrating rotation of the mechanical joint.

FIGS. 2A-2C illustrate translational and rotational degrees of freedom of the mechanical joint 100 of FIG. 1. FIG. 2A illustrates vertical translation (along a Y axis) of the second body 102(2) relative to the first body 102(1). For example, vertical translation of the second body 102(2) away from the first body 102(1) is possible by rotation of the vertex end 108(1) of the first triangular linkage 104(1) (about the base end 106(1)) away from the first body 102(1), and rotation of the vertex end 108(2) of the second triangular linkage 104(2) (about the base end 106(2)) away from the second body 102(2). In other words, rotation of the first triangular linkage 104(1) relative to the second triangular linkage 104(2), such that the base end 106(1) is moved away from base end 106(2).

FIG. 2B illustrates horizontal translation (along an X axis) of the second body 102(2) relative to the first body 102(1). For example, horizontal translation from a center aligned position is possible by rotation of the vertex end 108(1) of the first triangular linkage 104(1) away from the first body 102(1), rotation of the vertex end 108(2) of the second triangular linkage 104(2) toward the second body 102(2), and rotation of the first triangular linkage 104(1) away from the second triangular linkage 104(2).

FIG. 2C illustrates rotation (around an X axis) of the second body 102(2) relative to the first body 102(1). Although rotation around the X axis is illustrated, the ball joint 112 between the first triangular linkage 104(1) and the second triangular linkage 104(2) allows the second body 102(2) to be rotated around an X axis, Y axis, and/or Z axis. For example, if the first body 102(1) and the first triangular linkage 104(1) remain stationary, rotation of the second triangular linkage 104(2) about the ball joint 112 provides rotation of the second body 102(2) relative to the first body 102(1).

Referring to FIGS. 2A-2C, while the second body 102(2) may move relative to the first body 102(1) in five degrees of freedom (translation along X axis and Y axis and rotation about X axis, Y axis, and Z axis), the second body 102(2) is constrained in one translational degree of freedom (along the Z axis). It is noted that unlike other configurations, vertical movement is independent of lateral movement. In other words, for example, unlike a Panhard rod, Watt's linkage, and/or V-Stay the mechanical joint 100 allows for only vertical movement of the second body 102(2) relative to the first body 102(1) without any corresponding lateral movement. In other words, the mechanical joint 100 allows for pure vertical movement, which is not possible with other types of connections.

Figure 3:
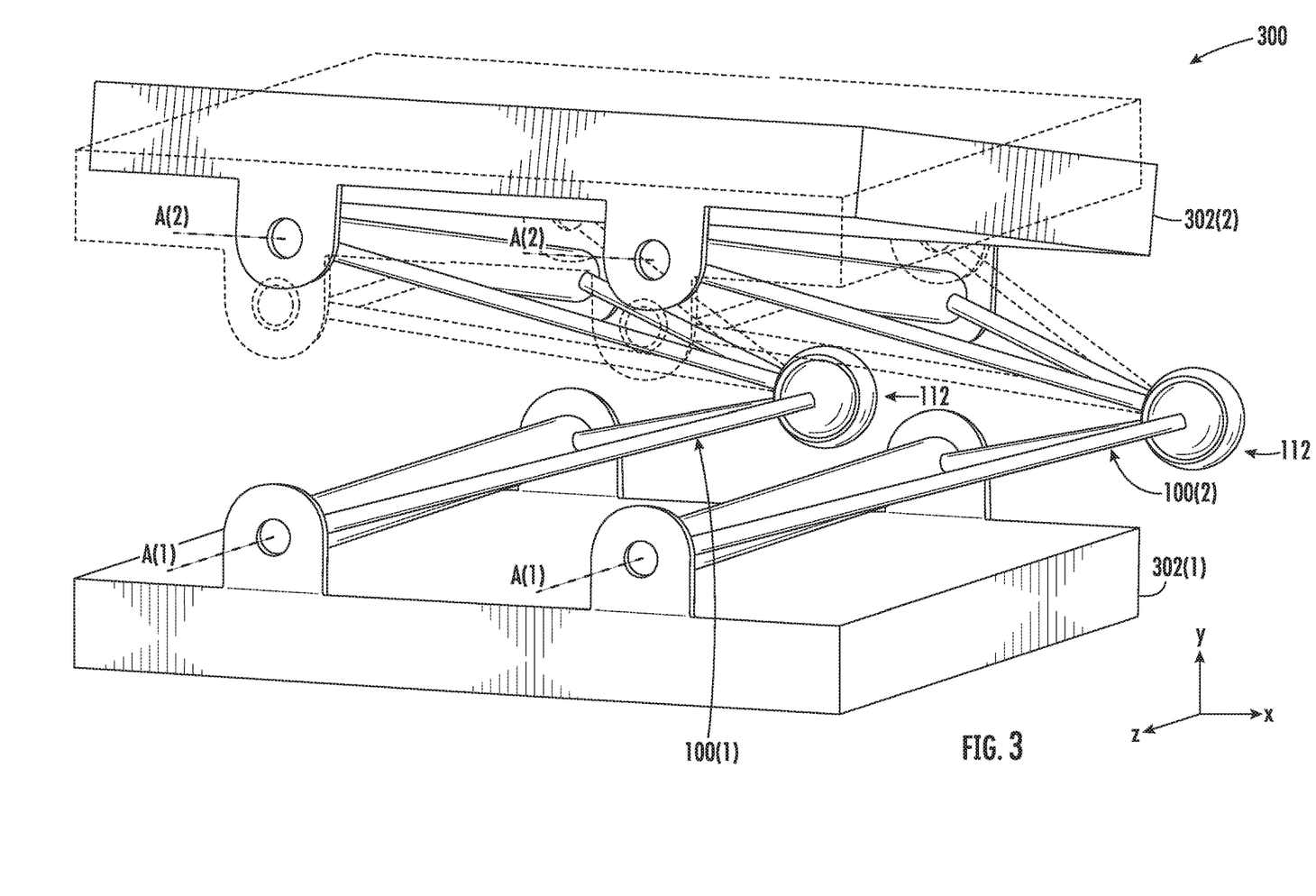
FIG. 3 is a perspective view illustrating rotation of a mechanical system using the two mechanical joints of FIGS. 1-2C.

FIG. 3 is a perspective view illustrating rotation of a mechanical system 300 using two of the mechanical joints 100(1), 100(2) of FIGS. 1-2C. As similarly discussed above regarding the mechanical joints 100(1), 100(2), the mechanical system 300 includes a first body 302(1), a second body 302(2), and at least two mechanical joints 100(1), 110(2) coupling the first body 302(1) to the second body 302(2), The first base axes A(1) of the at least two mechanical joints 100(1), 100(2) are parallel to one another, and the second base axes A(2) of the at least two mechanical joints 100(1), 100(2) are parallel to one another. In certain embodiments, the base axes A(1) and/or A(2) are not parallel to one another.

As with the mechanical joints 100(1), 100(2) of FIGS. 1-2C discussed above, the second body 302(2) of the mechanical system 300 is able to translate relative to the first body 302(1) along the X axis and Y axis but is constrained translationally along the Z axis. With the at least two mechanical joints 100(1), 100(2), the second body 302(2) of the mechanical system 300 is able to rotate relative to the first body 302(1) about the X axis and Z axis but is generally constrained about the Y axis. In particular, for example, each of the two mechanical joints 100(1), 100(2) is fixed to the second body 302(2) by a hinged connection about base axes A(2). Accordingly, rotation of the second body 302(2) about the second mechanical joint 100(2) forces the base axes A(2) of the first mechanical joint 100(1) into an arced motion away from the ball joint 112 of the first mechanical joint 100(1). The first mechanical joint 100(1) cannot accommodate and thereby restricts such motion. Although constrained about the Y axis, stress is generally reduced about the Y axis by use of the ball joint 112 which is able to absorb such lateral forces by small rotational movement about the ball joint 112. Such rotational movement about the ball joint 112 reduces stress concentrations due to lateral forces. Accordingly, comparatively, the ball joint 112 increases robustness and reduces potential failure of the mechanical joints 100(1), 100(2).

Figure 4A:
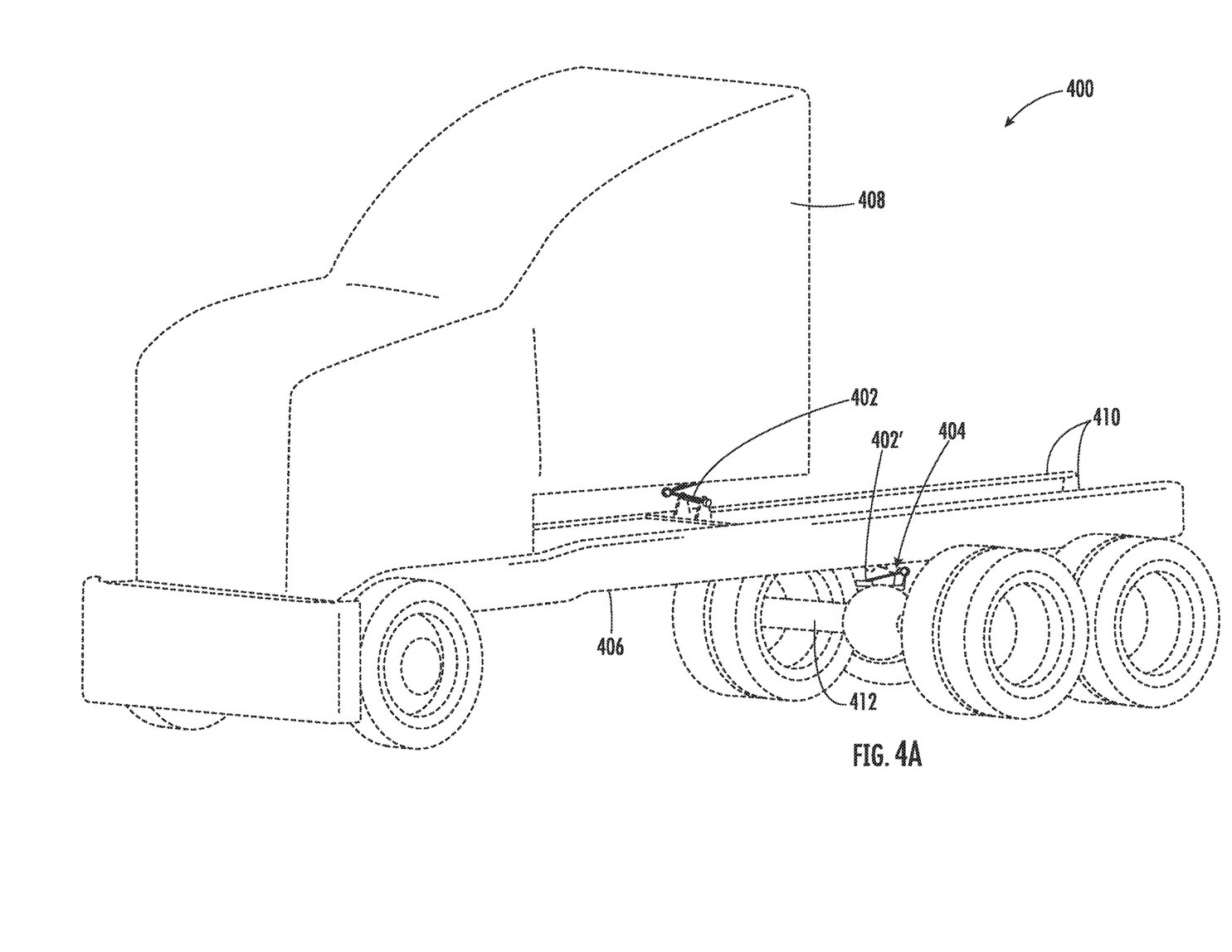
FIG. 4A is a front side perspective view of a vehicle including the mechanical joint of FIGS. 1-2C and the mechanical system of FIG. 3.
Figure 4B:
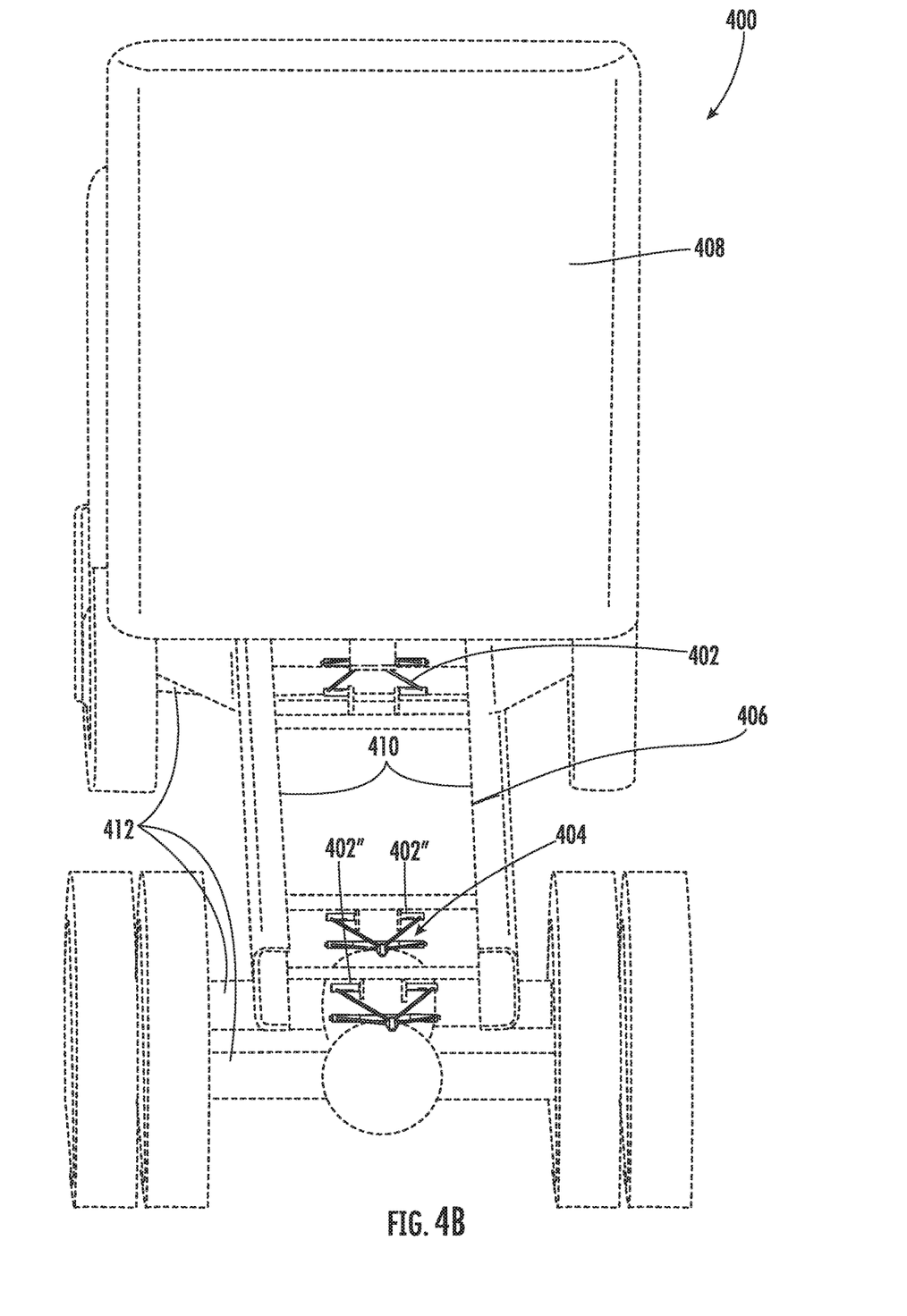
FIG. 4B is a rear perspective view of the vehicle of FIG. 4A.

FIGS. 4A and 4B are front side and rear perspective views, respectively, of a vehicle 400 including mechanical joints 402, 402', 402" of FIGS. 1-2C and mechanical system 404 of FIG. 3. The vehicle 400 includes a chassis 406 and a cab body 408. The chassis 406 includes frame rails 410 and axles 412. Although the vehicle 400 shown is a truck, it is noted that the mechanical joint 402 and/or the mechanical system 404 may be used on other types of vehicles. Further, it is noted that the mechanical joint 402 and/or mechanical system 404 may be positioned at any of multiple locations on the vehicle 400. The mechanical joints 402, 402', 402" couple the chassis 406 to the cab body 408. The mechanical system 404 couples the frame rails 410 of the chassis 406 to the axles 412 of the chassis. In certain embodiments, one or more of the mechanical joints 402, 402', 402" include a V-stay system. It is noted that these mechanical joints 402, 402', 402" may be used anywhere a Panhard rod or Watt's linkage may be applicable.

Figure 5:
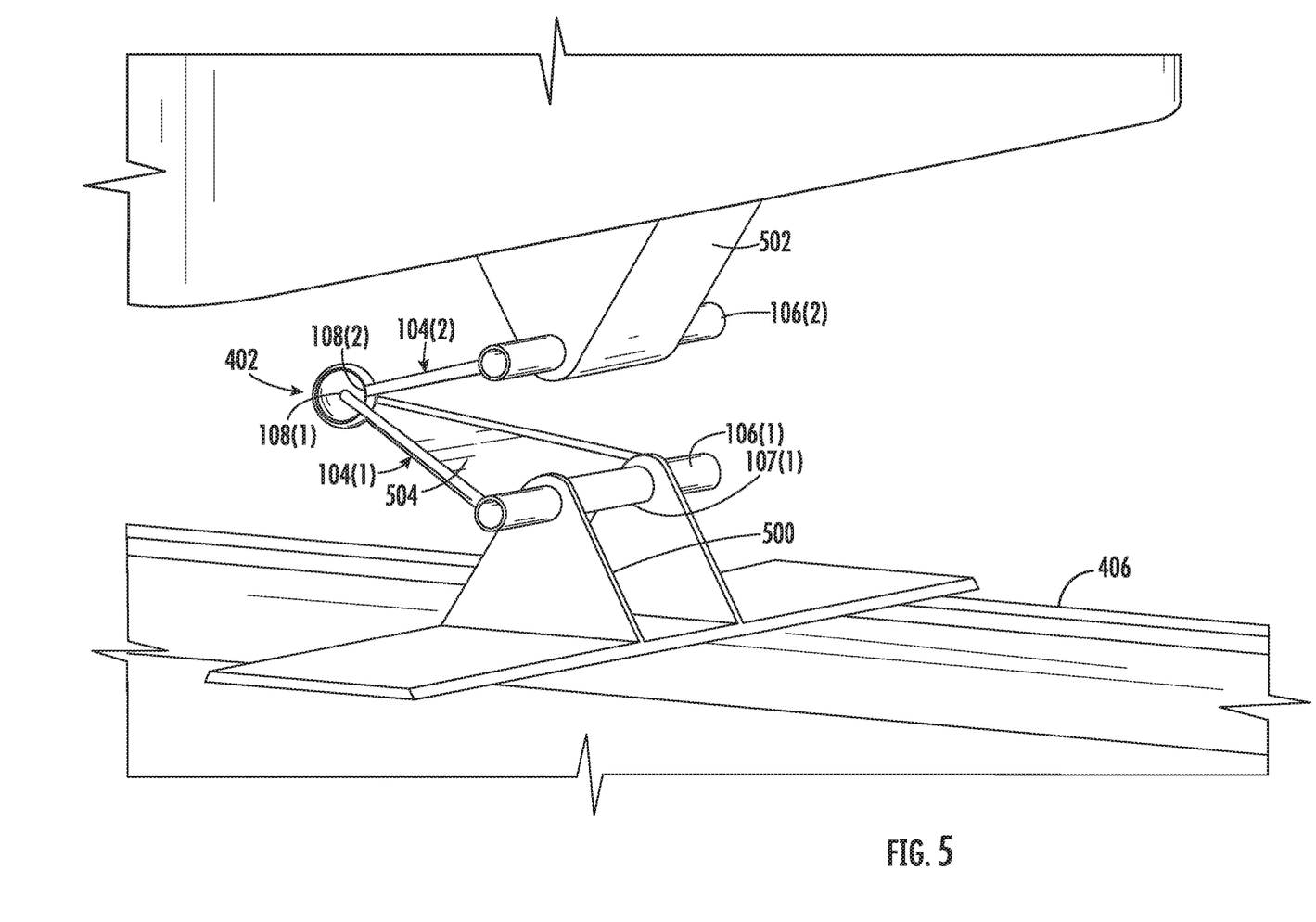
FIG. 5 is close-up perspective view of the mechanical joint of the vehicle of FIGS. 4A-4B coupling a cab body of the vehicle to a chassis of the vehicle.

FIG. 5 is close-up perspective view of the mechanical joint 402 of the vehicle 400 of FIGS. 4A-4B coupling the cab body 408 of the vehicle 400 to the chassis 406 of the vehicle 400. The base end 106(1) of the first triangular linkage 104(1) hingedly couples to the chassis 406 (e.g., at flanges 500) and pivots relative to the chassis 406. The first triangular linkage 104(1) is restricted to one degree of freedom relative to the chassis 406. The base end 106(2) of the second triangular linkage 104(2) hingedly couples to the cab body 408 (e.g., at hub 502) and pivots relative to the cab body 408. The second triangular linkage 104(2) is restricted to one degree of freedom relative to the cab body 408. In certain embodiments, multiple mechanical joints 402 may be used to couple the cab body 408 to the chassis 406. In certain embodiments, the first triangular linkage 104(1) includes the bar 107(1) at the base end 106(1) and a triangular plate 504 extending from the base end 106(1) to the vertex end 108(1). As noted above, different triangular configurations may be used (e.g., plate 504 without a bar 107(1)).

Accordingly, the mechanical joint 402 permits relative movement of the cab body 408 relative to the chassis 406 in five degrees of freedom, but is restricted laterally. Such a configuration allows for vertical movement while also reducing stress and risk of failure on the mechanical joint 402.

Figure 6:
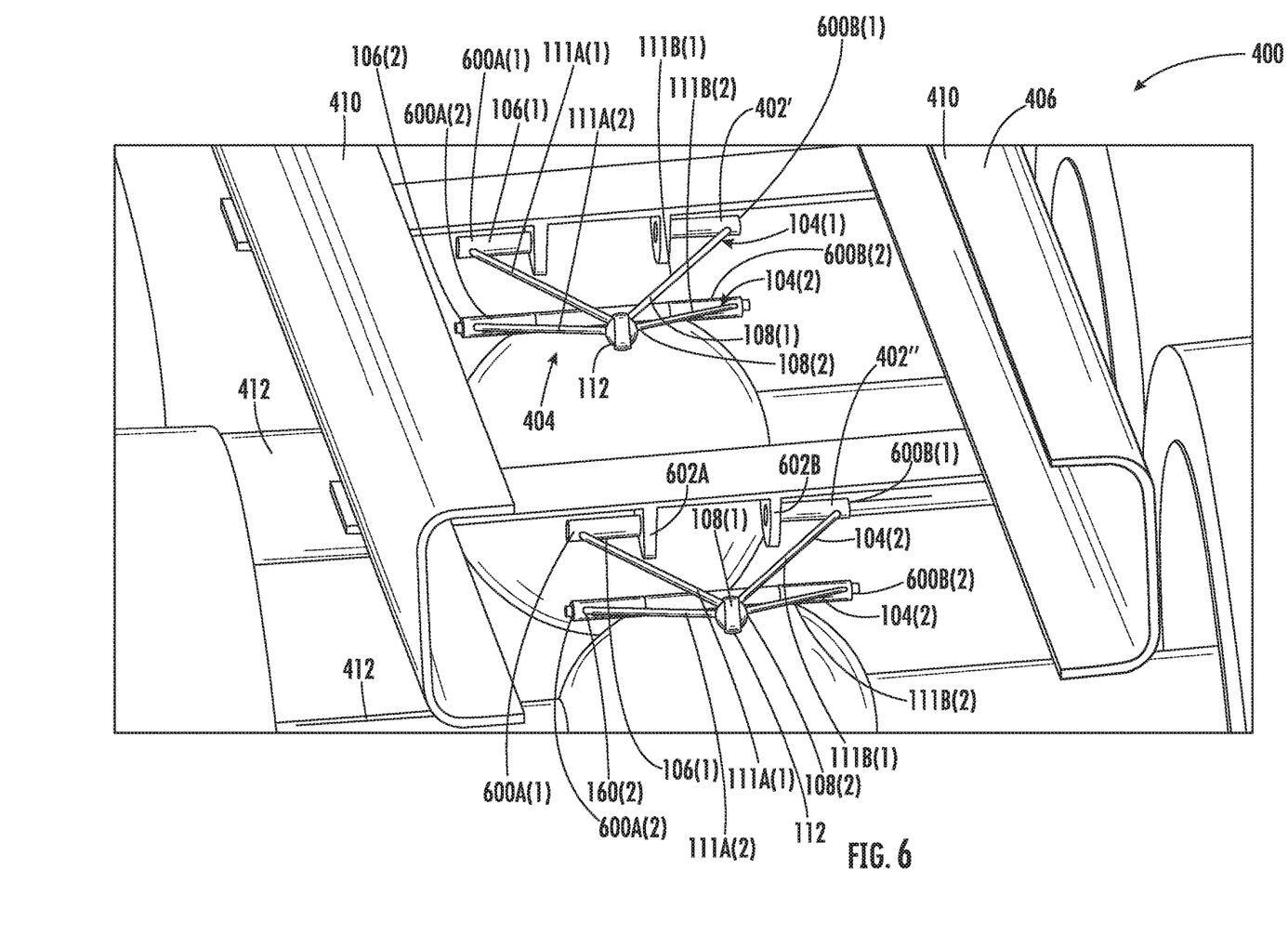
FIG. 6 is close-up perspective view of the mechanical system of the vehicle of FIGS. 4A-4B coupling the chassis of the vehicle to axles of the vehicle.

FIG. 6 is close-up perspective view of the mechanical system 404 of the vehicle 400 of FIGS. 4A-4B coupling the chassis 406 of the vehicle 400 to the axles 412 of the vehicle 400. The mechanical system 404 includes a plurality of mechanical joints 402', 402". Each mechanical joint 402', 402" of the mechanical system 404 couples one of the plurality of axles 412 to the frame rails 410 of the chassis 406. In certain embodiments, for each of the at least two mechanical joints 402', 402", the first triangular linkage 104(1) includes two arms 111A(1), 1116(1) extending from the base end 106(1) to the vertex end 108(1), each of the two arms 111A(1), 111B(1) configured to independently and hingedly couple to the axles 412. In particular, an end 600A(1) of the first arm 111A(1) is coupled to a first flange 602A and an end 600A(2) of the second arm 111B(1) is coupled to a second flange 602B. As noted above, different triangular configurations may be used. A similar configuration may also be provided to couple the second triangular linkage 104(2) to the chassis 406.

For each mechanical joint 402', 402", the base end 106(1) of the first triangular linkage 104(1) hingedly couples to the axle 412 and pivots relative to the axle 412. The first triangular linkage 104(1) is restricted to one degree of freedom relative to the axle 412. The base end 106(2) of the second triangular linkage 104(2) hingedly couples to the frame rails 410 and pivots relative to the frame rails 410. The second triangular linkage 104(2) is restricted to one degree of freedom relative to the frame rails 410. In certain embodiments, more or fewer mechanical joints 402', 402" may be used.

With the mechanical system 404, the chassis 406 is able to rotate relative to the axles 412 about the X axis and Z axis but is constrained about the Y axis. Although constrained about the Y axis, stress is generally reduced about the Y axis by use of the ball joint 112 which is able to absorb such lateral forces. In particular, small rotational movement about the ball joint 112 reduces stress concentrations due to lateral forces (especially as compared to V-Stays or other similar connections). Accordingly, the ball joint 112 increases robustness and reduces potential failure of the mechanical joints 402', 402".

Those skilled in the art will recognize improvements and modifications to the preferred embodiments of the present disclosure. All such improvements and modifications are considered within the scope of the concepts disclosed herein and the claims that follow.

What is claimed is:

1. A mechanical system, comprising:
   a first body;
   a second body comprising a front end and an opposing rear end, and a longitudinal axis extending between the front and rear ends; and
   at least two mechanical joints coupling the first body to the second body, each of the at least two mechanical joints comprising:
   a first triangular linkage comprising a base end configured to hingedly couple to the first body to pivot relative to the first body about a first base axis and a vertex end comprising a first rotational member; and
   a second triangular linkage comprising a base end configured to hingedly couple to the second body to pivot relative to the second body about a second base axis and a vertex end comprising a second rotational member;

wherein the first rotational member and the second rotational member are rotationally coupled to form a ball joint;

wherein a first mechanical joint of the at least two mechanical joints is longitudinally spaced apart from a second mechanical joint of the at least two mechanical joints; and wherein the second body is moveable in two translational degrees of freedom and restricted in one translational degree of freedom relative to the first body.

2. The mechanical system of claim 1, wherein each of the first triangular linkage and the second triangular linkage comprises a bar at the base end and two arms extending from the bar to the vertex end.

3. The mechanical system of claim 2, wherein each of the first triangular linkage and the second triangular linkage comprises a triangular plate extending from the bar to the vertex end.

4. The mechanical system of claim 1, wherein, each of the first triangular linkage and the second triangular linkage comprises two arms extending from the base end to the vertex end, each of the two arms of the first triangular linkage configured to independently and hingedly couple to the first body, and each of the two arms of the second triangular linkage configured to independently and hingedly couple to the second body.

5. The mechanical system of claim 1, wherein the first triangular linkage is hingedly coupled for one degree of freedom relative to the first body and the second triangular linkage is hingedly coupled for one degree of freedom relative to the second body.

6. The mechanical system of claim 1, wherein axes of the first triangular linkage of the at least two mechanical joints are parallel to one another.

7. The mechanical system of claim 6, wherein axes of the second triangular linkage of the at least two mechanical joints are parallel to one another.

8. A vehicle, comprising:

a chassis comprising frame rails and a plurality of axles;

a cab body comprising a front end and an opposing rear end, and a longitudinal axis extending between the front and rear ends; and at least two mechanical joints coupling the chassis to the cab body, each of the at least two mechanical joints comprising:

a first triangular linkage comprising a base end configured to hingedly couple to the chassis to pivot relative to the chassis and a vertex end comprising a first rotational member; and a second triangular linkage comprising a base end configured to hingedly couple to the cab body to pivot relative to the cab body and a vertex end comprising a second rotational member;

wherein the first rotational member and the second rotational member are rotationally coupled to form a ball joint;

wherein a first mechanical joint of the at least two mechanical joints is longitudinally spaced apart from a second mechanical joint of the at least two mechanical joints; and wherein the cab body is moveable in two translational degrees of freedom relative to the chassis and is restricted in one translational degree of freedom relative to the chassis.

9. The vehicle of claim 8, wherein, for the at least two mechanical joints, each of the first triangular linkage and the second triangular linkage comprises a bar at the base end and two arms extending from the bar to the vertex end.

10. The vehicle of claim 8, wherein, for the at least two mechanical joints, each of the first triangular linkage and the second triangular linkage comprises a triangular plate extending from the base end to the vertex end.

11. The vehicle of claim 8, wherein, for the at least two mechanical joints, each of the first triangular linkage and the second triangular linkage comprises two arms extending from the base end to the vertex end, each of the two arms of the first triangular linkage is configured to independently and hingedly couple to the chassis, and each of the two arms of the second triangular linkage is configured to independently and hingedly couple to the cab body.

12. The vehicle of claim 8, wherein, for the at least two mechanical joints, the first triangular linkage is hingedly coupled for one degree of freedom relative to the chassis, and the second triangular linkage is hingedly coupled for one degree of freedom relative to the cab body.

13. The vehicle of claim 8, further comprising a mechanical system comprising a plurality of mechanical joints, each mechanical joint of the mechanical system configured to couple one of the plurality of axles to the frame rails.

* * * * *